(12) United States Patent
Cordier et al.

(10) Patent No.: US 7,528,351 B2
(45) Date of Patent: May 5, 2009

(54) BILLET SUPPORT SYSTEM FOR INDUCTION HEATING

(75) Inventors: Jean-Pierre J. A. Cordier, Montigny-le-Tilleul (BE); Gary A. Doyon, Grosse Pointe Farms, MI (US); John H. Hooper, Pentwater, MI (US); Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 143 days.

(21) Appl. No.: 11/038,855

(22) Filed: Jan. 20, 2005

(65) Prior Publication Data

US 2006/0000826 A1 Jan. 5, 2006

Related U.S. Application Data

(60) Provisional application No. 60/538,132, filed on Jan. 21, 2004.

(51) Int. Cl.
*H05B 6/22* (2006.01)
*H05B 6/12* (2006.01)

(52) U.S. Cl. ...................... 219/647; 219/622

(58) Field of Classification Search ................ 219/647, 219/648, 622, 774, 676
See application file for complete search history.

(56) References Cited

U.S. PATENT DOCUMENTS

| 3,774,002 | A | * | 11/1973 | Jensen | 219/647 |
| 4,117,293 | A | * | 9/1978 | Wicker et al. | 219/646 |
| 4,195,213 | A | * | 3/1980 | Chiboroski | 219/658 |
| 4,619,717 | A | * | 10/1986 | Balzer et al. | 148/112 |
| 4,627,259 | A | * | 12/1986 | Andersson et al. | 72/202 |
| 5,396,050 | A | * | 3/1995 | Ebihara et al. | 219/603 |
| 6,289,033 | B1 | * | 9/2001 | Tipton et al. | 373/7 |
| 6,730,893 | B1 | * | 5/2004 | Runde | 219/635 |

* cited by examiner

*Primary Examiner*—Daniel L Robinson
(74) *Attorney, Agent, or Firm*—Philip O. Post

(57) ABSTRACT

An apparatus and process are provided for supporting a billet inside an induction coil while the billet is being heated by electric induction. Two or more rails of a heat resistant ceramic material provide a curvilinear surface on which the billet can slide into and out of the coil and sit on during the heating process. Rail position adjustment means may be provided for moving the rails to accommodate billets of various sizes.

16 Claims, 5 Drawing Sheets

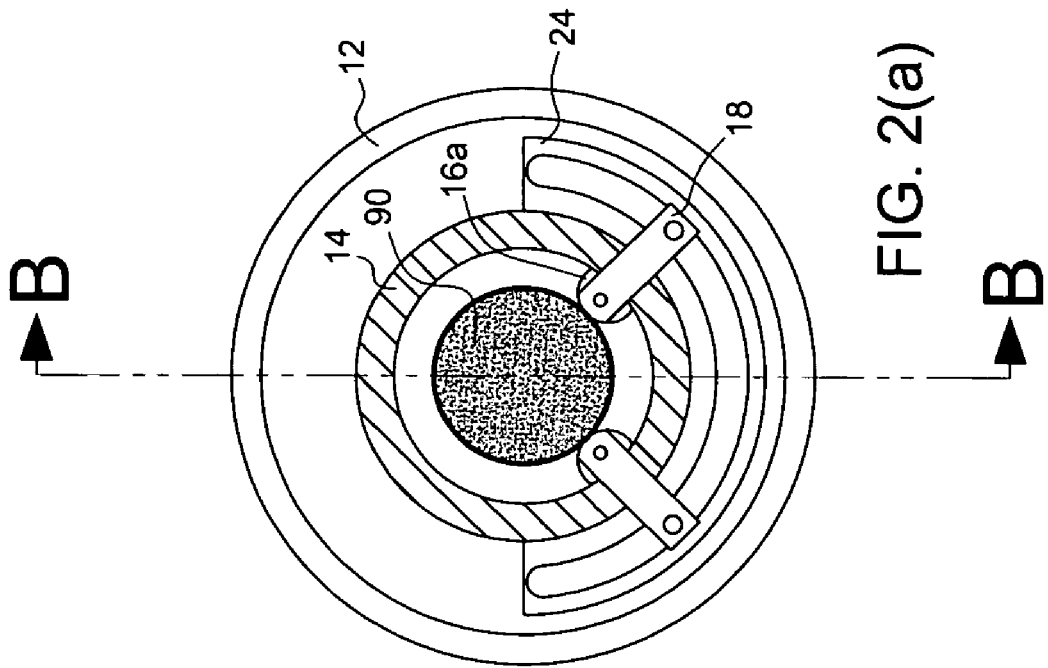
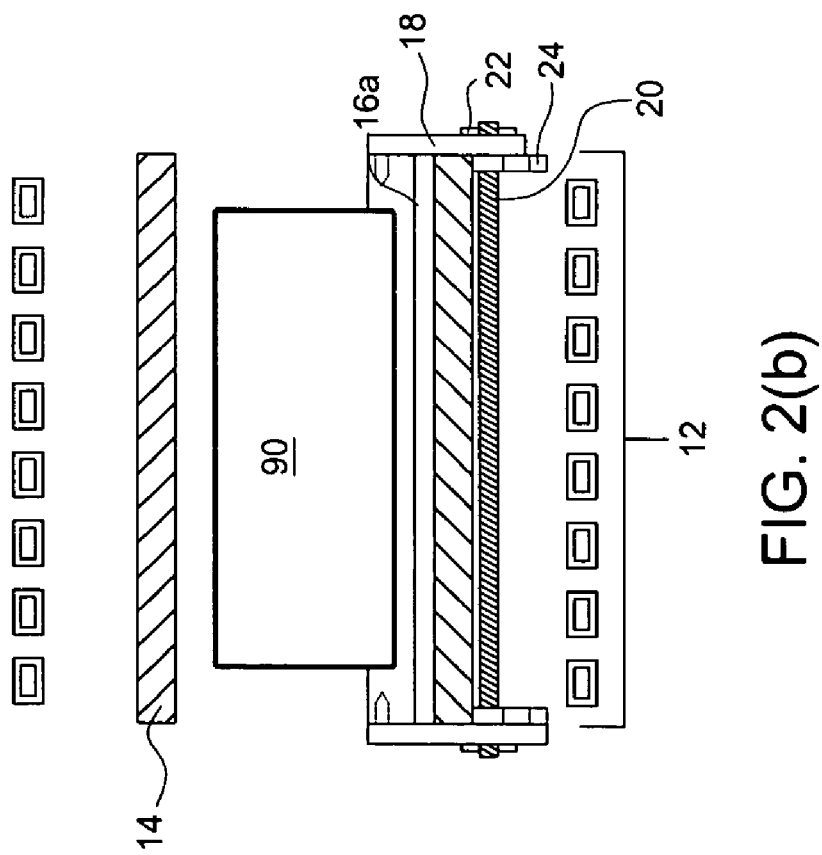

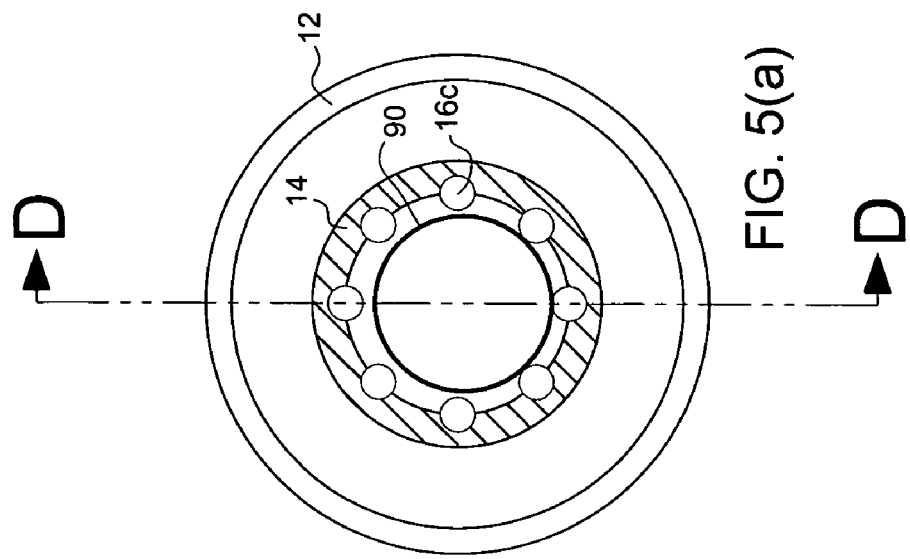
FIG. 5(a)
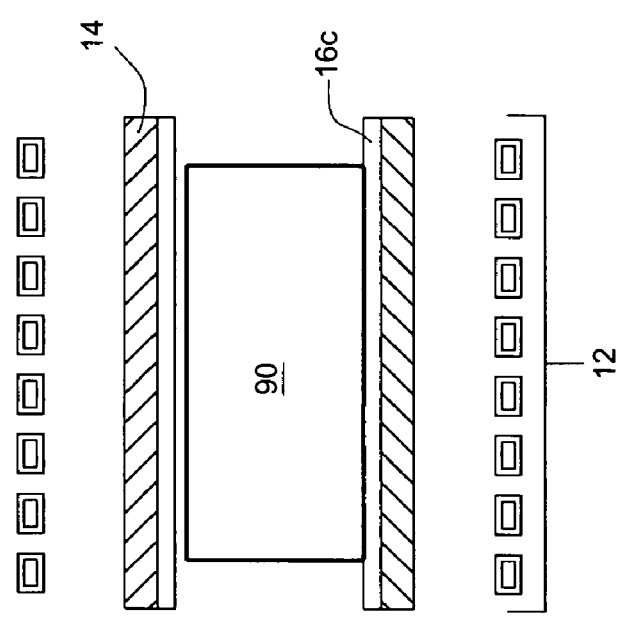
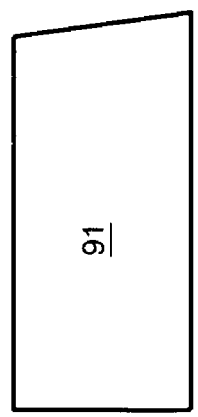
FIG. 5(b)

BILLET SUPPORT SYSTEM FOR INDUCTION HEATING

CROSS REFERENCE TO RELATED APPLICATIONS

This application claims the benefit of U.S. Provisional Application No. 60/538,132 filed Jan. 21, 2004, hereby incorporated herein by reference in its entirety.

FIELD OF THE INVENTION

The present invention relates to a billet support system for supporting a billet while it is heated by electric induction.

BACKGROUND OF THE INVENTION

A billet composed of an electrically conductive material can be heated by electric induction. The billet is placed inside a solenoidal coil and ac current supplied to the coil establishes a magnetic field that penetrates the billet. The field induces eddy current in the billet that heats the billet. Generally there are three methods of placing a billet inside the coil. In the first method the coil is seated in a container that is placed within the coil. The container may be an open boat-shaped structure formed from a non-magnetic material such as a stainless steel. In the second method the billet is pushed into the coil by an appropriate mechanical system and seated on billet support members. In the third method the billet is externally supported while a portion (such as the center or an end) of the billet is inductively heated; this method is not applicable to billet support when the billet length is shorter than the coil. In all methods a thermal insulating material generally surrounds the billet within the coil to assist in retention of the induced heat. This thermal insulating material generally takes the form of an open cylinder formed from a suitable refractory. Known billet support systems comprise two or more water-cooled rods disposed longitudinally along the interior wall of the thermal insulating material. The rods are composed of non-magnetic material such as a stainless steel. The billet is pushed into the coil and seated on the rods. The rods are cooled by flowing a cooling medium, such as water, through passages within the rods. Cooling is required since a significant amount of heat induced in the billets can be transferred by conduction to the rods. Further the rods may be electrically conductive and experience some induced heating from the generated magnetic field. Over time the rod material wears away and portions of the internal cooling passages leak water, which can cause electrical short circuits in the induction coil. Further the necessity of making water connections to the rods inhibits repositioning of the rods to better accommodate billets of varying sizes. Therefore there is the need for a billet support system that does not require water or other internal cooling systems and can be easily adjusted to handle multiple sizes of billets.

BRIEF SUMMARY OF THE INVENTION

In one aspect, the present invention is an apparatus for, and method of, supporting a billet within an induction coil. The billet support system comprises two or more rails having a curvilinear surface upon which the billet sits in the coil. In some examples of the invention, the rails are longitudinally disposed within a thermal insulating element. In some examples of the invention, the rails are formed from a heat-resistant ceramic and are individually adjustable about the thermal insulating element to accommodate billets of varying dimensions.

Other aspects of the invention are set forth in this specification.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 2(a) is a side elevational view of another example of the billet support system of the present invention wherein adjusting elements of each support rail utilize common elements.

FIG. 2(b) is a cross sectional view through line B-B in FIG. 2(a).

FIG. 5(a) is a side elevational view of another example of the billet support system of the present invention wherein support rails are radially disposed around the opening for a billet.

FIG. 5(b) is a cross sectional view through line D-D in FIG. 5(a).

DETAILED DESCRIPTION OF THE INVENTION

Figure 1A:
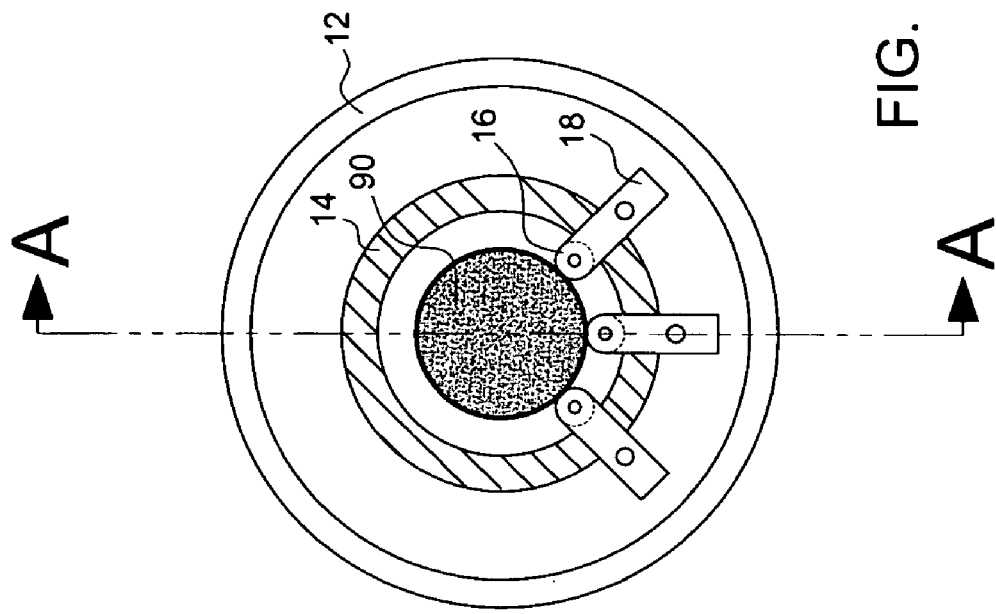
FIG. 1(a) is a side elevational view of one example of the billet support system of the present invention wherein adjusting elements of each support rail are independent from each other.
Figure 1B:
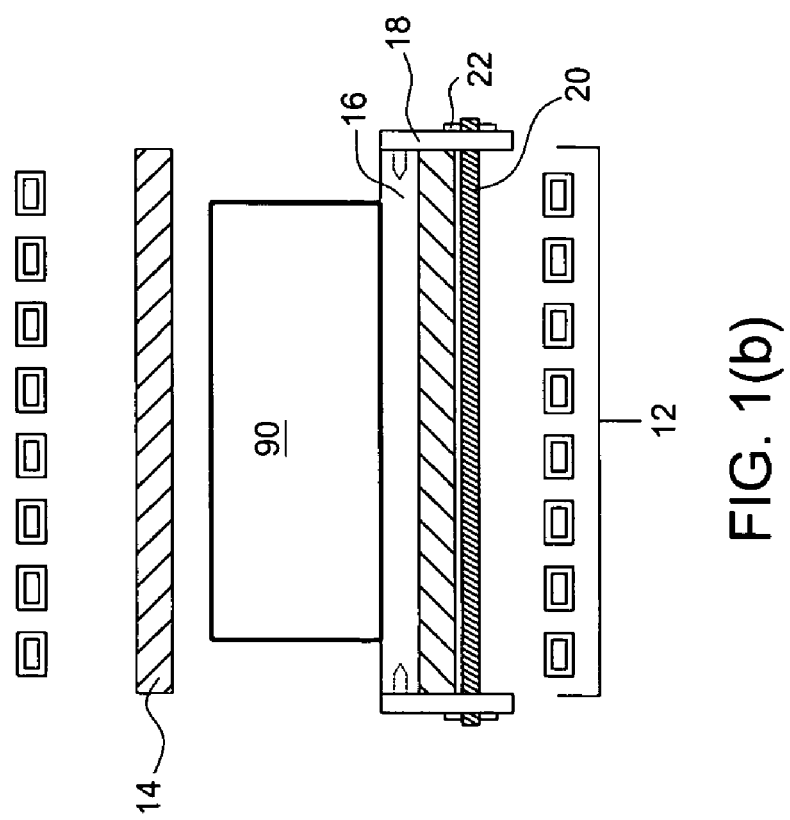
FIG. 1(b) is a cross sectional view through line A-A in FIG. 1(a).

There is shown in FIG. 1(a) and FIG. 1(b) one example of the billet support system of the present invention. Thermal insulation 14 is generally cylindrical in shape and is inserted within solenoidal induction coil 12. In this non-limiting example of the invention three rails 16 are longitudinally disposed along the interior wall of thermal insulation 14.

Each rail comprises a heat resistant material, such as a ceramic based on silicon (Si), aluminum (Al), oxygen and nitrogen (generally known as a "sialon" ceramic). See U.S. Pat. No. 4,113,503 for one example of a sialon ceramic. Each rail is generally cylindrical in shape; however the shape of the rail is not limited to cylindrical shapes. In general the rail is shaped to provide a curvilinear seating surface for a billet. A hole is provided at each end of a rail. Each side support member 18 includes an appropriately shaped dowel to fit in the hole. Joining member 20 can be a threaded rod that protrudes at each end through a hole in each of the side support members as shown for one of the three rails in FIG. 1(b). Fasteners 22 rigidly hold together the rectangular-shaped frame structure formed by rail 16, two side members 18 and joining member 20. In this example of the invention billet 90 is pushed into the open cylinder formed by thermal insulation 14 to make contact with and slide along portions of the curvilinear surfaces of the three rails. Generally coil 12 will be much closer to the billet than diagrammatically shown in FIG. 1(a) and FIG. 1(b). Side members 18 may be extended so that joining member 20 is disposed external to coil 12. Alternatively joining member 20 may be replaced by independent fasteners associated with each side member to hold a rail in place.

FIG. 2(*a*) and FIG. 2(*b*) illustrate another example of the billet support system of the present invention wherein arc-shaped joining member 24 provides a means for adjusting the locations of rails 16*a* about the inner wall of the thermal insulation. In this non-limiting example an arc-shaped opening in member 24 provides the adjusting means. The opening may be appropriately notched or marked for set alternative rail positions to accommodate billets of various sizes. Side members 18 for each rail are joined together as shown in FIG. 2(*a*) which, in this example, is similar to the method used in FIG. 1(*a*) except for the inclusion of arc-shaped joining members 24. In alternative examples of the invention each side member, in lieu of the hole through which joining member 20 passes, may have a post passing though the arc-shaped opening in adjacent joining member 24 which is used to fasten the side member to joining member 24. For example the post may be threaded and fastened about joining member 24 with a bolt. In this particular example of the invention the rails are generally hemispherical in cross section and modified with a base curvature to conform to the curvature of the inside wall of the thermal insulation.

Figure 3:
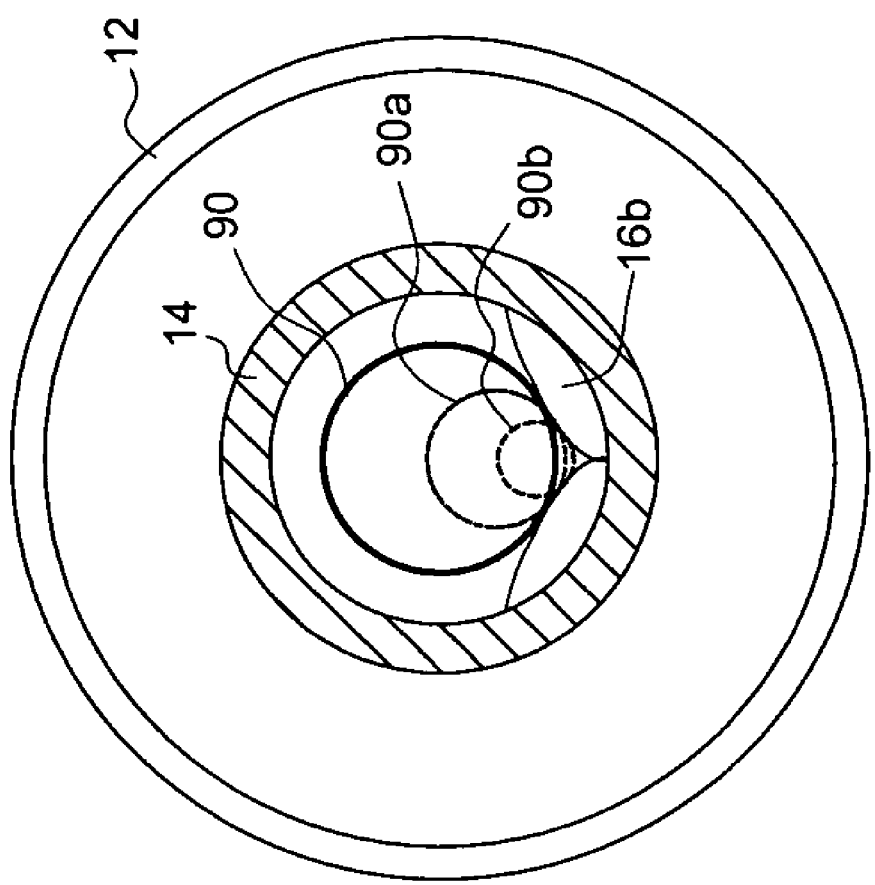
FIG. 3 is a side elevational view of another example of the billet support system of the present invention wherein the support rails provide sufficient curvilinear billet seating surfaces for varying sizes of billets without adjustment of the support rails.

FIG. 3 illustrates another example of the billet support system of the present invention. In this example rails 16*b* are two in number and generally semielliptical in cross section and modified with a base curvature to conform to the curvature of the inside wall of the open cylinder. The broad cross sectional curvilinear billet seating surface afforded by generally semielliptical rails 16*b* provides a billet support means that can accommodate a variety of sizes of billets (e.g. billets 90, 90*a* and 90*b* with perimeters shown in FIG. 3) without adjusting the positions of rails 16*b*. In this example rails 16*b* may be permanently attached to the thermal insulation, integrally cast with the thermal insulation or imbedded in the thermal insulation. In other examples of the invention rails 16*b* may be provided with position adjusting members as illustrated in FIG. 1(*a*) or FIG. 2(*a*).

Figure 4A:
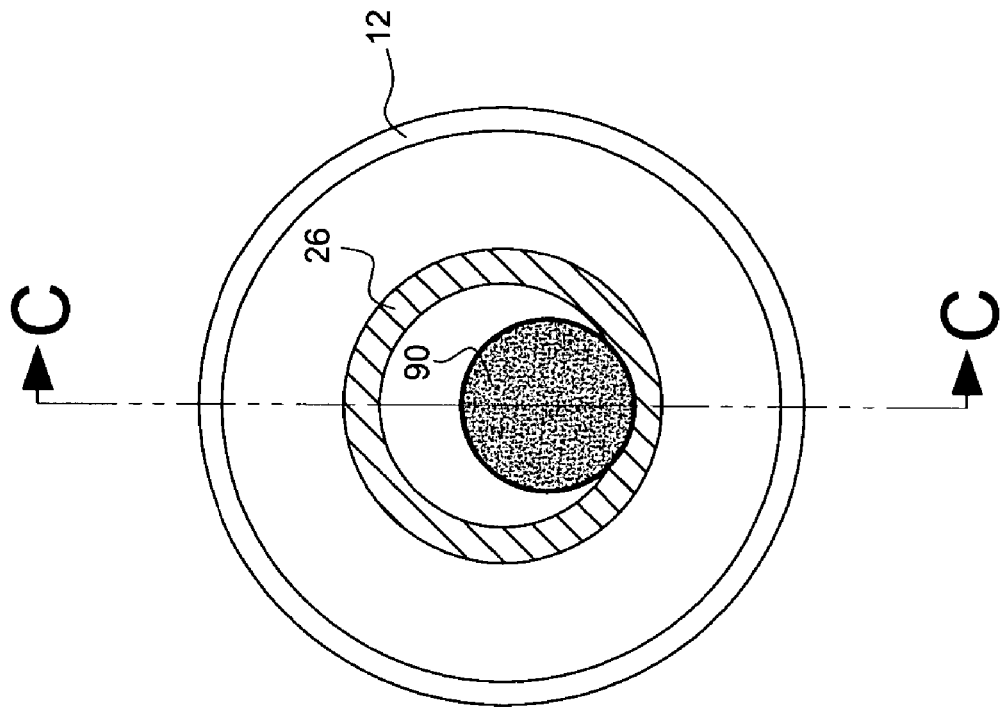
FIG. 4(a) is a side elevational view of another example of the billet support system of the present invention wherein the support system also serves as a thermal insulating structure.
Figure 4B:
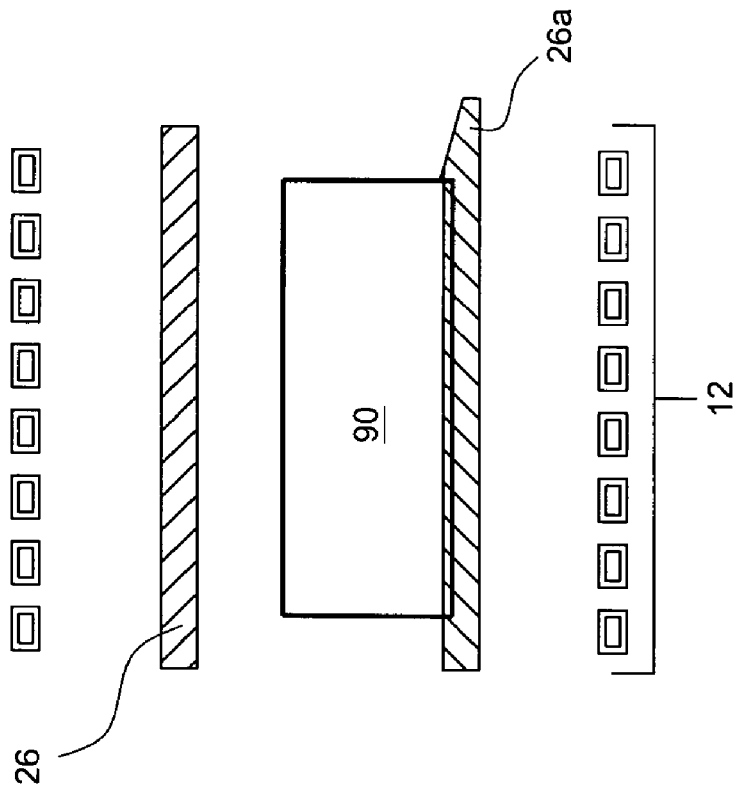
FIG. 4(b) is a cross sectional view through line C-C in FIG. 4(a).

FIG. 4(*a*) and FIG. 4(*b*) illustrate another example of the billet support system of the present invention wherein the function of billet support is provided by a generally cylindrically-shaped element 26 into which a billet is insert at entrance end 26*a*. In this example the entrance end is beveled or otherwise shaped to prevent jamming the billet against the end of element 26 as it is pushed into the element. Further the interior bottom wall of element 26 may deviate from true cylindrical to provide a better seating surface for the billet as shown in FIG. 4(*a*). In this example of the invention element 26 can serve both as the means for seating the billet inside the coil and as thermal insulating means.

FIG. 5(*a*) and FIG. 5(*b*) illustrate another example of the billet support system of the present invention wherein a plurality of rails 16*c* are radially disposed around the opening in which a billet is placed. In this arrangement of the invention rails 16*c* may be fastened about thermal insulation 14 as described above or partially embedded into the thermal insulation as shown in the figures. The exposed curvilinear surfaces of the lower rails provide a surface for seating a billet in and sliding a billet through the coil. The exposed curvilinear surfaces of the other rails provide a means for preventing a billet from jamming into the interior wall of the insulation as it is pushed through the coil. For example, as shown in FIG. 5(*b*) while billet 90 has substantially vertical end surfaces, billet 91, which will push billet 90 out of the coil as billet 91 is pushed into the coil has a leading end surface that is skewed from the vertical. In such situations the leading end of billet 90 will have a tendency to jam against the upper interior wall of the thermal insulation. The exposed curvilinear surfaces of rails 16*c* embedded in the upper wall will provide a low friction surface upon which billet 90 will continue to slide out of the coil rather than jam in the coil.

In the above examples of the invention cylindrically-shaped thermal insulation 14 may be replaced by any other structure suitable for mounting of the rails, or mounting structure, when rail mounting is required within the induction coil. That is the rail mounting structure may be separate from the thermal insulation if used. Generally the thermal insulation comprises a substantially non-magnetic material.

The foregoing examples do not limit the scope of the disclosed invention. The scope of the disclosed invention is further set forth in the appended claims.

The invention claimed is:

1. A billet support system without external cooling means for supporting an electrically conductive billet within an induction coil while the billet is inductively heated by a magnetic field established by the flow of ac current in the induction coil, the billet support system comprising at least two curvilinearly shaped rails arranged within the induction coil for seating of the billet, each of the at least two curvilinearly shaped rails substantially comprising a sialon.

2. The billet support system of claim 1 further comprising a means for adjusting the position of at least one of the at least two curvilinearly shaped rails for seating of differently shaped billets.

3. The billet support system of claim 1 further comprising a mounting element inserted within the induction coil, each of the at least two curvilinearly shaped rails disposed inside the mounting element.

4. The billet support system of claim 3 wherein the mounting element is a generally cylindrically shaped thermal insulation.

5. The billet support system of claim 3 further comprising a means for adjusting the position of at least one of the at least two curvilinearly shaped rails about the interior of the mounting element.

6. A billet support system without external cooling means for supporting an electrically conductive billet within an induction coil while the billet is inductively heated by a magnetic field established by the flow of ac current in the induction coil, the billet support system comprising at least two curvilinearly shaped rails arranged within the induction coil for seating of the billet, each of the at least two curvilinearly shaped rails comprising a heat resistant material, a mounting element inserted within the induction coil, each of the at least two curvilinearly shaped rails disposed inside the mounting element, a side member attached to each end of the at least one of the at least two curvilinearly shaped rails, and a means for adjusting the position of at least one of the at least two curvilinearly shaped rails about the interior of the mounting element.

7. The billet support system of claim 6 wherein the fastening means comprises a rod attached at opposing ends to the end of the side member attached to each end of the at least one of the at least two curvilinearly shaped rails, the rod located outside of the mounting element.

8. A billet support system without external cooling means for supporting an electrically conductive billet within an induction coil while the billet is inductively heated by a magnetic field established by the flow of ac current in the induction coil, the billet support system comprising at least two curvilinearly shaped rails arranged within the induction coil for seating of the billet, each of the at least two curvilinearly shaped rails comprising a heat resistant material, a mounting element inserted in the induction coil, each of the at least two curvilinearly shaped rails disposed inside the mounting element, and a means for adjusting the position of at least two of the at least two curvilinearly shaped rails about the interior of the mounting element.

9. The billet support system of claim 8 wherein the means for adjusting the position of at least two of the at least two curvilinearly shaped rails comprises a side member attached to each end of the at least one of the at least two curvilinearly shaped rails and a common fastening means for holding the side members of the at least two of the at least two curvilinearly shaped rails in place.

10. A billet support system without external cooling means for supporting an electrically conductive billet within an induction coil while the billet is inductively heated by a magnetic field established by the flow of ac current in the induction coil, the billet support system comprising:
    a mounting element disposed within the induction coil; and
    at least two curvilinearly shaped rails arranged inside the mounting element for seating of the billet, each of the at least two curvilinearly shaped rails substantially comprising a sialon and disposed on the interior surface of the thermal insulation.

11. The billet support system of claim 10 wherein the mounting element is a generally cylindrically shaped thermal insulation.

12. A billet support system without external cooling means for supporting an electrically conductive billet within an induction coil while the billet is inductively heated by a magnetic field established by the flow of ac current in the induction coil, the billet support system comprising a generally cylindrically shaped element inserted within the induction coil, the generally cylindrically shaped element substantially comprising a sialon having an at least partially beveled end at least one end for receiving the billet for seating on the interior surface of the generally cylindrically shaped element.

13. A billet support system without external cooling means for supporting an electrically conductive billet within an induction coil while the billet is inductively heated by a magnetic field established by the flow of ac current in the induction coil, the billet support system comprising a plurality of curvilinearly shaped rails arranged around the interior of the induction coil to form a path for sliding the billet through the interior of the plurality of curvilinearly shaped rails, the plurality of curvilinearly shaped rails substantially comprising a sialon.

14. The billet support system of claim 13 further comprising a mounting element disposed within the induction coil, the plurality of curvilinearly shaped rails arranged around the interior of the mounting element.

15. The billet support system of claim 14 wherein the mounting element comprises a substantially cylindrically shaped element and the plurality of curvilinearly shaped rails are disposed around the interior surface of the substantially cylindrically shaped element.

16. The billet support system of claim 14 wherein the mounting element comprises a substantially cylindrically shaped element and the plurality of curvilinearly shaped rails are at least partially embedded in the interior wall of the substantially cylindrically shaped element.

* * * * *